US009806362B2

United States Patent
Fasold et al.

(10) Patent No.: US 9,806,362 B2
(45) Date of Patent: Oct. 31, 2017

(54) HUMIDIFICATION DEVICE, IN PARTICULAR FOR A FUEL CELL

(71) Applicant: MANN+HUMMEL GMBH, Ludwigsburg (DE)

(72) Inventors: Michael Fasold, Auenwald (DE); Marcel Mayer, Stuttgart (DE); Michael Maier, Reisbach (DE); Michael Wank, Coburg (DE); Heinz Dobusch, Freudental (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 89 days.

(21) Appl. No.: 14/633,825

(22) Filed: Feb. 27, 2015

(65) Prior Publication Data
US 2015/0171445 A1    Jun. 18, 2015

Related U.S. Application Data

(63) Continuation of application No. PCT/EP2013/067495, filed on Aug. 30, 2013.

(30) Foreign Application Priority Data

Aug. 30, 2012 (DE) .......................... 10 2012 017 142

(51) Int. Cl.
*H01M 8/04* (2016.01)
*B01F 3/04* (2006.01)
(Continued)

(52) U.S. Cl.
CPC ...... *H01M 8/04291* (2013.01); *B01D 63/084* (2013.01); *B01D 63/085* (2013.01);
(Continued)

(58) Field of Classification Search
CPC ..... H01M 2008/1095; H01M 8/04119; H01M 8/04126; H01M 8/04141; H01M 8/04149; H01M 8/04291; B01D 2313/04; B01D 2313/13; B01D 2313/14; B01D 63/084; B01D 63/085; B01D 65/003; B01D 69/10; B01D 69/12; B01F 3/04099; B64D 2013/0662; Y02E 60/50
See application file for complete search history.

(56) References Cited

U.S. PATENT DOCUMENTS

| 4,428,585 A | 1/1984 | Dugge |
| 8,091,868 B2 | 1/2012 | Robb |

(Continued)

*Primary Examiner* — Carlos Barcena
(74) *Attorney, Agent, or Firm* — James Hasselbeck

(57) ABSTRACT

A humidification device is provided with at least one stacked unit with water vapor-permeable membranes arranged parallel and spaced apart relative to each other. The membranes each have an edge area framed by frames. The frames are formed by a film composite of a lower film and an upper film, wherein the lower and upper films of the film composite clamp the edge area of one or more of the membranes therebetween. The lower and upper films of the film composite are fixedly connected to each other. Alternatively, the frames are formed by a thermoplastic yarn that is sewn into the edge area of one or more of the membranes, respectively, wherein the thermoplastic yarn is reshaped by heat and pressure.

10 Claims, 3 Drawing Sheets

(51) Int. Cl.
*B01D 69/10* (2006.01)
*B01D 69/12* (2006.01)
*B01D 63/08* (2006.01)
*B01D 65/00* (2006.01)
*H01M 8/04291* (2016.01)
*H01M 8/04119* (2016.01)
*H01M 8/1018* (2016.01)
*B64D 13/06* (2006.01)

(52) U.S. Cl.
CPC ........... *B01D 65/003* (2013.01); *B01D 69/10* (2013.01); *B01D 69/12* (2013.01); *B01F 3/04099* (2013.01); *H01M 8/04149* (2013.01); B01D 2313/04 (2013.01); B01D 2313/13 (2013.01); B01D 2313/14 (2013.01); B64D 2013/0662 (2013.01); H01M 2008/1095 (2013.01)

(56) References Cited

U.S. PATENT DOCUMENTS

| | | |
|---|---|---|
| 2001/0046616 A1 | 11/2001 | Mossman |
| 2004/0115489 A1* | 6/2004 | Goel ............... H01M 8/04119 429/413 |
| 2008/0001313 A1 | 1/2008 | Zhang et al. |
| 2010/0291462 A1 | 11/2010 | Thate |
| 2012/0181712 A1 | 7/2012 | Vanderwees et al. |

* cited by examiner

HUMIDIFICATION DEVICE, IN PARTICULAR FOR A FUEL CELL

CROSS-REFERENCE TO RELATED APPLICATIONS

This application is a continuation application of international application No. PCT/EP2013/067495 having an international filing date of 23 Aug. 2013 and designating the United States, the International Application claiming a priority date of 30 Aug. 2012, based on prior filed German patent application No. 10 2012 017 142.0, the entire contents of the aforesaid international application and the aforesaid German patent application being incorporated herein by reference.

BACKGROUND OF THE INVENTION

The invention concerns a humidification device, in particular for a fuel cell, comprising a stacked unit that contains several water vapor-permeable membranes that are arranged parallel and spaced apart relative to each other, wherein the membranes are framed by a frame at the edges.

Such a humidification device is disclosed in EP 1 261 992 B1. The humidification device is correlated with a fuel cell and serves for enriching an air stream with moisture that is subsequently supplied to the fuel cell system in which electric current is generated by an electrochemical reaction. The humidification device comprises a water vapor-permeable membrane that is clamped between two frame parts in which flow openings for the supply or discharge of air streams are provided. Water molecules penetrate through the membrane from the moist air stream to the dry air stream that is enriched with moisture in this way and is subsequently supplied to the fuel cell.

A humidification device for a fuel cell is also disclosed in US 2001/0046616 A1 that discloses also a membrane that is clamped between two frame parts.

SUMMARY OF THE INVENTION

It is the object of the invention to provide a humidification device of a constructively simple configuration with which an air stream can be enriched with moisture and which comprises several water vapor-permeable membranes framed by a frame.

This object is solved according to the invention with the features of the independent claims. The dependent claims provide expedient further embodiments.

With the aid of the humidification device according to the invention, flow air can be enriched with moisture. The humidification device comprises at least one stacked unit with several water vapor-permeable membranes which are arranged parallel and spaced apart relative to each other. The membranes are framed at the edge by a frame. Preferably, each membrane has correlated therewith a frame or frame part wherein the frames or frame parts including the membranes can be stacked on each other and form the stacked unit.

By enriching the air stream with moisture, a required minimum moisture contents is achieved. The humidification device is used, for example, for a fuel cell in which electric current can be produced by an electrochemical reaction by utilizing the moisture-enriched supplied flow air. The membranes of the humidification device are permeable to water vapor, but not to air, so that through the membranes exclusively a water exchange takes place from the air stream with higher moisture to the air stream with lower moisture which is supplied to the fuel cell as supply air. The stacked unit can comprise a great number of such membranes that are each secured in a frame. The humidification device can receive optionally several stacked units in a housing.

As a further application possibility, for example, use of the humidification device for enriching breathing air in enclosed spaces or cabins is conceivable, for example, in airplanes or motor vehicles. Also, the humidification device can be employed for dehumidifying exhaust gases.

According to a first embodiment of the invention, the frame is embodied by a film composite which comprises two films resting on each other and between which the edge of one membrane is clamped, respectively. The lower film and the upper film are contacting the bottom side or the top side of a membrane in its edge area and enclose in this way the edge of the membrane. The lower and the upper films are fixedly connected to each other so that a clamping force which is acting on the membrane and which secures the membrane is generated.

This embodiment has the advantage that the two films which are resting on each other can be connected in various ways with each other while the intermediately positioned clamped membrane must not mandatorily be connected with the upper or the lower film. In principle, it is sufficient that the membrane is secured exclusively by the clamping force between the upper and lower films; a further connection to one of the films is not required. In this way, there is also no need to have to apply, for example, an adhesive onto the edge area of the membrane and to perform preparatory measures for this purpose, for example, etching of the edge area of the membrane.

On the other hand, the films can be connected in various ways with each other. Preferably, the upper and the lower films are adhesively connected to each other wherein the connection is realized outside of the membrane. As films, self-adhesive films are conceivable or other films onto which an adhesive is applied, for example. The films are optionally lamination films. The projecting rim of the films which is positioned radially outside of the outer edge of the membrane and where the two films are connected to each other has, for example, a width of 2 mm.

A further advantage of the embodiment of the frame as film composite resides in the relatively minimal thickness. This makes it possible to configure stacked units with several membranes with minimal spacing relative to each other.

According to a further aspect of the invention, the frame which frames one membrane, respectively, is formed by a yarn which is sewn into the edge area of the membrane. By the sewing action, a form-fit connection between the yarn and the edge area of the membrane is achieved.

The embodiment of the frame as a yarn which is sewn in on the edge area to the membrane, has the advantage that various configurations in the edge area are possible. Moreover, no additional adhesive for producing the frame is required. Also, when producing the frame, excess frame material that can not be utilized any further is avoided. Finally, by means of the sewing action, seams can be introduced into the membrane even within the circumferentially extending frame at a spacing to the edge area, for example, seams for hemming and stabilizing cutouts in the membrane through which, for example, pipes or the like are being guided.

In principle, different types of seams can be generated in the edge area of the membrane. Conceivable are, for example, a zigzag seam, a seam with overlock stitch etc. It can be advantageous to employ in the edge area a relatively large quantity of yarn material in order to effect the desired stabilization of the membrane in its edge area.

It is furthermore advantageous that the thickness of the frame is relatively minimal so that in the stacked unit membranes can be arranged with an appropriate minimal spacing relative to each other.

A further advantage of sewing within the edge area resides in that no adhesive must be applied onto the edge area of the membrane and, accordingly, also no pretreatment, for example, by etching, is required.

A further advantage is to be seen in that no frame, or a frame that is projecting only minimally past the edge area of the membrane, is generated so that the stacked unit is not enlarged or at least not significantly enlarged by producing the frame in the plane of the membrane.

According to an expedient embodiment, the yarn is comprised of a thermoplastic material and, after sewing into the edge area of the membrane, is thermoplastically reshaped by heat application and under pressure. Due to the thermoplastic shaping process a film-like surface in the edge area is achieved; also, stitching holes that are generated by sewing in the edge area of the membrane are sealed.

According to a further expedient embodiment, an auxiliary thread or auxiliary tape is applied onto the edge area of the membrane and is stitched over by the yarn. In this way, the material application in the edge area of the membrane for forming the frame is increased and the stability of the edge area is improved. One or several auxiliary threads can be applied onto one of the sides of the edge area or onto both sides. The auxiliary thread or auxiliary tape is expediently also produced of a thermoplastic material so that, after stitching over with the thermoplastic yarn, a thermoplastic shaping can take place which also encompasses the auxiliary thread or the auxiliary tape.

The thermoplastic shaping action can involve pressing in the yarn or also the optionally present auxiliary thread or the auxiliary tape. In this way, a smoothed surface of the frame is produced; also, the thickness is made uniform.

Optionally, several membranes immediately resting on each other are fastened within one frame, respectively, wherein the central intermediately positioned membrane is a functional membrane and the outer membranes each form a cover membrane. The composite of several membranes resting on each other is fixedly secured in the correlated frame or frame part. In case of an embodiment of the frame as a film composite with a lower and an upper film between which the edge area of the membrane composite is clamped, leakage flows across the outer edge of the membranes as well as leakage flows between the membranes of the membrane composite are impossible. The same applies also for the embodiment of the humidification device with a frame that is formed by a yarn wherein the yarn sews together the edge area of all of the membranes resting on each other.

Advantageously, each membrane or each membrane composite in the stacked unit is framed by a frame or a frame part, respectively. Frames and membranes that are resting on each other are separated from each other by spacer elements which, in the area of the frames, can be embodied as a circumferentially extending adhesive bead which, on the one hand, connects neighboring frames to each other and, on the other hand, takes on the function of a sealing material and closes off the flow space between neighboring membranes in a flow-tight manner. Moreover, plastic spacer elements can be provided between spaced-apart membranes. As plastic spacer elements, an adhesive tape can be used also.

The stacked unit is expediently inserted into a housing of the humidification device. Optionally, several stacked units, each comprising several frames and membranes, can be inserted into the housing.

BRIEF DESCRIPTION OF THE DRAWINGS

Further advantages and expedient embodiments can be taken from the further claims, the figure description, and the drawings.

In the figures, the same components are provided with same reference characters.

DESCRIPTION OF PREFERRED EMBODIMENTS

Figure 1:
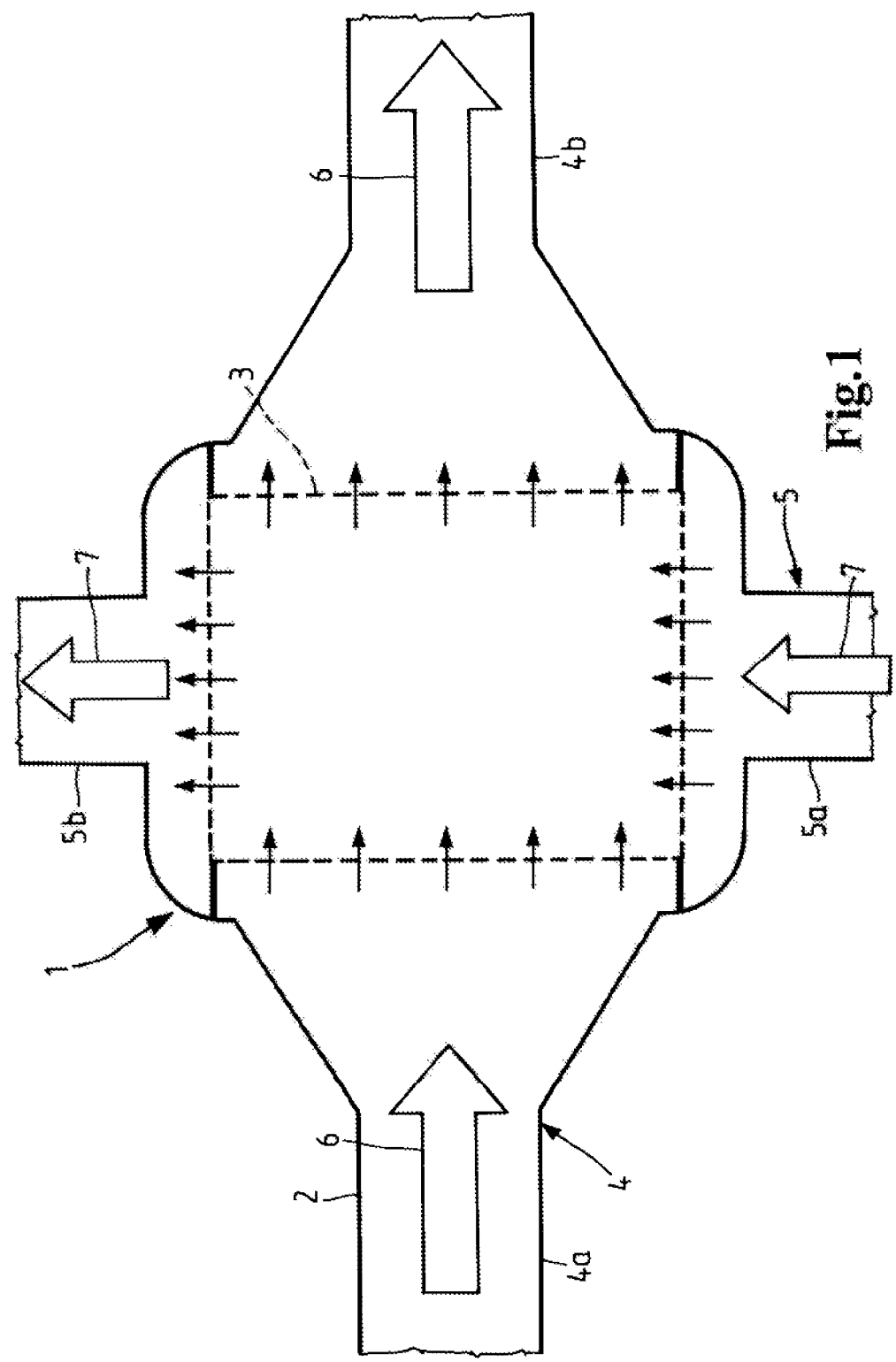
FIG. 1 is a plan view onto a humidification device for a fuel cell with a housing in which a stacked unit with several stacked water vapor-permeable membranes is received.

In FIG. 1, a humidification device 1 for a fuel cell is illustrated by means of which fresh air enriched with moisture and having a minimum moisture is supplied to a fuel cell. Arranged in a housing 2, the humidification device 1 comprises an exchangeably inserted cartridge 3 which serves to transfer the moisture contained in an exhaust gas stream onto a dry fresh air stream that is supplied to the fuel cell. The cartridge 3 comprises a stacked unit with a plurality of water-permeable membranes 9 that are stacked on each other.

The housing 2 of the humidification device 1 is provided with a supply air or fresh air channel 4 by means of which ambient air is supplied as fresh air. The supply air channel 4 comprises an inflow section 4a upstream of the cartridge 3 as well as a discharge section 4b downstream of the cartridge.

Displaced at a 90° angle relative to the supply air channel 4, the housing 2 is provided with an exhaust air channel 5 by means of which exhaust air of the fuel cell which is enriched with moisture is passed through the cartridge 3. The exhaust air channel 5 comprises an inflow section 5a upstream of the cartridge 3 and a discharge section 5b downstream of the cartridge 3.

The supply air stream 6 and the exhaust air stream 7 cross each other in accordance with the orientation of the channels 4 and 5 at a 90° angle but the air streams 6 and 7 within the cartridge 3 are separated by the water-permeable membranes 9 that enable only a transfer of water from the exhaust air stream 7 laden with a high moisture contents onto the dry supply air stream 6.

Figure 2:
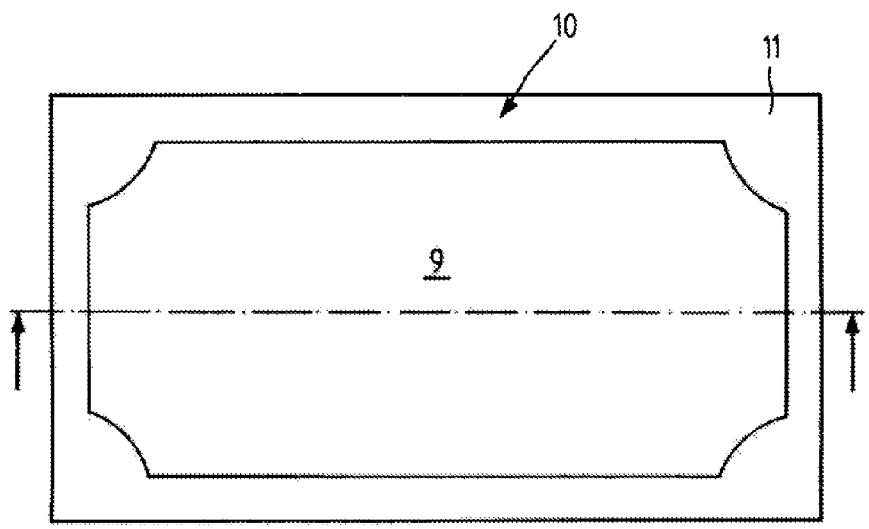
FIG. 2 shows a membrane, which is framed by a frame, in a plan view.
Figure 3:
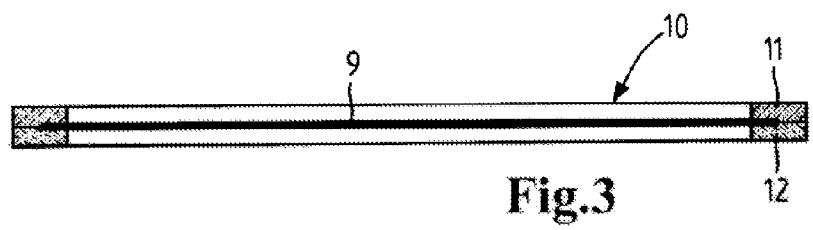
FIG. 3 shows the membrane with lateral frame in section.
Figure 4:
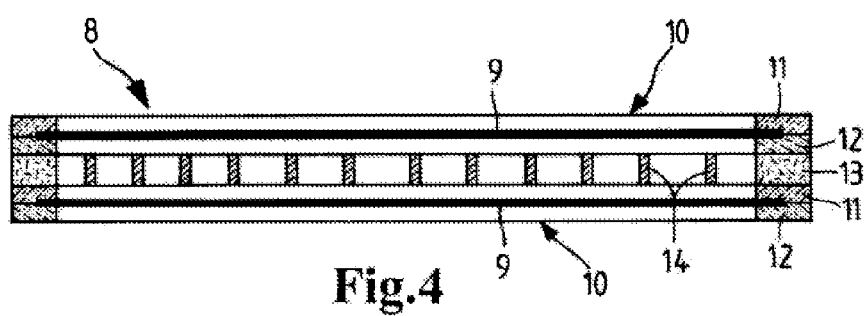
FIG. 4 shows a stacked unit with two membranes that are resting on each other.
Figure 5:
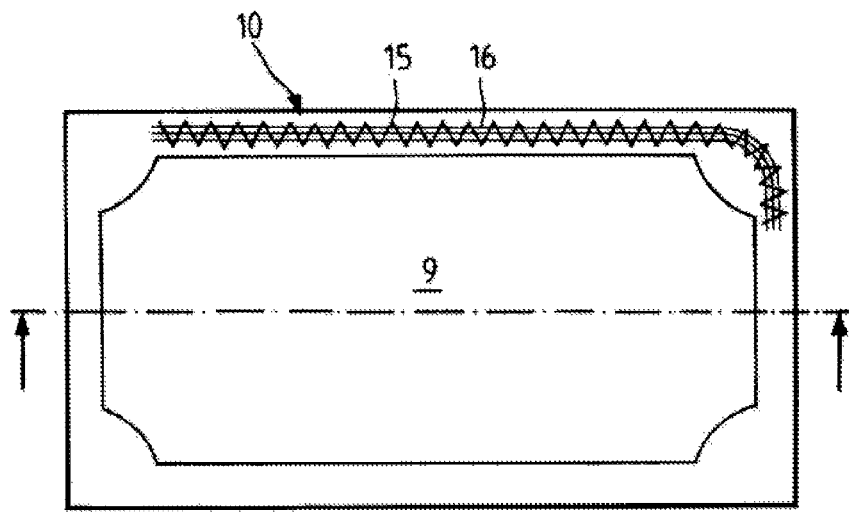
FIG. 5 shows a membrane with a frame in a further embodiment.
Figure 6:
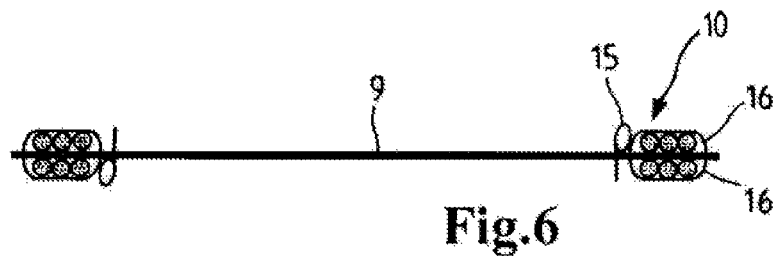
FIG. 6 shows the membrane with frame in section.
Figure 7:
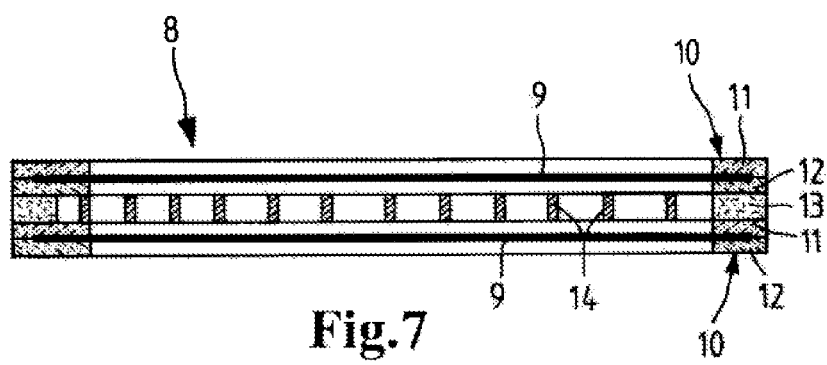
FIG. 7 shows a stacked unit with two membranes stacked on each other including the framing frame.

In FIGS. 2 to 4, a first embodiment of a water vapor-permeable membrane 9 is illustrated and in FIGS. 5 to 7 a second embodiment; the membrane 9 is framed by a frame 10 wherein the membrane 9 and the frame 10 are components of a stacked unit 8 in which several membranes 9 including their frames 10 are stacked on each other.

In the embodiment according to FIGS. 2 to 4, the frame 10 which frames the membrane 9 circumferentially at the edge is comprised of two parallel films 11 and 12 (FIGS. 3, 4) that are adhesively connected to each other and clamp the edge area of the membrane 9 between them. Moreover, the membrane 9 is not connected to the films 11, 12, in particular is not adhesively connected to the films. The films 11, 12, as can be seen in the plan view of FIG. 2, are cut to size to a circumferentially extending frame wherein the outer rim of the films 11, 12 projects past the edge area of the membrane 9. The adhesive connection of the upper film 11 with the lower film 12 is realized exclusively in the section which is outside of the edge area of the membrane 9.

The membrane 9 can be of a single layer configuration or of a multi-layer configuration. In case of a multi-layer configuration, there are, for example, three membranes that are immediately resting on each other of which the central membrane is a functional membrane and the outer ones each form a cover membrane. In case of a multi-layer configuration, the edge areas of the membranes are clamped by the two films 11, 12.

In FIG. 4, a stacked unit 8 is illustrated in an exemplary fashion with two membranes 9 that are stacked on each other; each one of the two membranes 9 can be embodied as a single layer or multi-layer configuration and framed by a circumferentially extending frame 10 which is comprised of an upper film 11 and a lower film 12. In order keep the membranes 9 spaced apart, the frames 10 of different membranes 9 are connected to each other by an adhesive material 13 at the rim wherein the adhesive material 13 additionally takes on the function of a seal. Also, plastic spacer elements 14 are arranged between the membranes 9. The plastic spacer elements 14 can additionally or alternatively be arranged in the rim area between the frames which are formed by the films 11 and 12 that are resting on each other and are connected to each other.

In FIGS. 5 to 7, a further embodiment is illustrated in which a single layer or multi-layer membrane 9 is framed by a circumferentially extending frame 10 at the edge. The frame 10, as can be seen in the section illustration according to FIG. 6, is formed by a yarn 15 which is sewn to the membrane 9 in the edge area. In addition to the yarn 15, auxiliary threads 16 at the top side and the bottom side of the membrane 9 are arranged in the edge area which, by being sewn in with the yarn 15, are connected with the membrane 9. The auxiliary threads 16 extend expediently in the circumferential direction along the edge on the topside as well as on the bottom side of the membrane 9. Several parallel extending auxiliary threads 16 can be arranged in the edge area.

The yarn 15 as well as the auxiliary threads 16 are comprised of a thermoplastic material. After sewing the yarn 15 onto the membrane 9, the yarn 15 as well as the auxiliary threads 16 are thermoplastically reshaped by generating pressure and heat so that a film-like surface or structure of the frame 10 is achieved, as illustrated in FIG. 7. By thermoplastic shaping, stitch holes which are produced in the membrane 9 upon sewing on the yarn 15 are sealed. Also, a surface structure as well as the thickness of the frame 10 are made uniform.

After the thermoplastic shaping action of the frame 10, the stacked unit 8 as shown in FIG. 7 can be produced by stacking several membranes 9 including the respective frames 10 on each other. The frames 10 are connected to each other by an intermediately positioned adhesive material 13 which separates the interior flow-tightly and also serves as a spacer element between the frames 10 resting on each other. In addition, plastic spacer elements 14 between parallel membranes 9 can be provided wherein the spacer elements 14 can be arranged, in addition or alternatively, also in the rim area between the frames 10.

While specific embodiments of the invention have been shown and described in detail to illustrate the inventive principles, it will be understood that the invention may be embodied otherwise without departing from such principles.

What is claimed is:

1. A humidification device comprising:
   at least one stacked unit comprising water vapor-permeable membranes arranged parallel and spaced apart relative to each other, the membranes each comprising an edge area,
   wherein the edge areas are framed by frames;
   wherein the frames each are formed by a yarn that is sewn into the edge area of one or more of the membranes, respectively;
   wherein the yarn is comprised of a thermoplastic material and the yarn, after having been sewn into the edge area of the one or more membranes, is thermoplastically reshaped.

2. The humidification device according to claim 1, further comprising an auxiliary thread or auxiliary tape applied onto the edge area of the one or more membranes and stitched over by the yarn.

3. The humidification device according to claim 2, wherein the auxiliary thread or the auxiliary tape is comprised of a thermoplastic material.

4. The humidification device according to claim 1, wherein three of the membranes resting immediately on each other are secured within one of the frames, respectively.

5. The humidification device according to claim 4, wherein a single one of the membranes is secured within one of the frames, respectively.

6. The humidification device according to claim 1, further comprising spacer elements, wherein the membranes and the frames are separated from each other within the at least one stacked unit in a parallel arrangement by the spacer elements.

7. The humidification device according to claim 6, wherein the spacer elements include an adhesive bead arranged between the frames.

8. The humidification device according to claim 6, wherein the spacer elements are plastic spacer elements arranged between the frames or the membranes.

9. The humidification device according to claim 1, comprising a housing adapted to receive the at least one stacked unit.

10. A fuel cell comprising a humidification device according to claim 1.

* * * * *